United States Patent
Fujimura et al.

(10) Patent No.: US 9,477,315 B2
(45) Date of Patent: Oct. 25, 2016

(54) INFORMATION QUERY BY POINTING

(71) Applicant: Honda Motor Co., Ltd., Tokyo (JP)

(72) Inventors: Kikuo Fujimura, Palo Alto, CA (US);
Victor Ng-Thow-Hing, Sunnyvale, CA (US); Behzad Dariush, San Ramon, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 204 days.

(21) Appl. No.: 14/192,499

(22) Filed: Feb. 27, 2014

(65) Prior Publication Data

US 2014/0282259 A1    Sep. 18, 2014

Related U.S. Application Data

(60) Provisional application No. 61/780,023, filed on Mar. 13, 2013.

(51) Int. Cl.
| | |
|---|---|
| *G06F 3/048* | (2013.01) |
| *G06F 3/01* | (2006.01) |
| *G02B 27/01* | (2006.01) |
| *G06F 3/03* | (2006.01) |
| *G06F 3/0482* | (2013.01) |
| *G06F 3/0484* | (2013.01) |
| *G06F 3/16* | (2006.01) |

(Continued)

(52) U.S. Cl.
CPC .............. *G06F 3/017* (2013.01); *G02B 27/01* (2013.01); *G06F 3/0304* (2013.01); *G06F 3/0346* (2013.01); *G06F 3/0482* (2013.01); *G06F 3/0487* (2013.01); *G06F 3/04842* (2013.01); *G06F 3/167* (2013.01); *G02B 2027/014* (2013.01); *G02B 2027/0138* (2013.01); *G02B 2027/0187* (2013.01)

(58) Field of Classification Search
CPC ...... G06F 3/017; G06F 3/167; G06F 3/0304; G06F 3/0481; G06F 3/04817; G06F 3/0482; G06F 3/04842; G02B 27/01
See application file for complete search history.

(56) References Cited

U.S. PATENT DOCUMENTS

| | | | |
|---|---|---|---|
| 7,148,913 B2 | 12/2006 | Keaton et al. | |
| 7,289,645 B2 | 10/2007 | Yamamoto et al. | |
| 7,308,112 B2 | 12/2007 | Fujimura et al. | |

(Continued)

FOREIGN PATENT DOCUMENTS

EP    2273353 A1    1/2011

OTHER PUBLICATIONS

Leung et al. (A Review and Taxonomy of Distortion-Oriented Presentation Techniques, ACM Transactions on Computer-Human Interaction, vol. 1, No. 2, Jun. 1994).*

(Continued)

*Primary Examiner* — Hien Duong
(74) *Attorney, Agent, or Firm* — Arent Fox LLP

(57) ABSTRACT

Navigating through objects or items in a display device using a first input device to detect pointing of a user's finger to an object or item and using a second input device to receive the user's indication on the selection of the object or the item. An image of the hand is captured by the first input device and is processed to determine a location on the display device corresponding to the location of the fingertip of the pointing finger. The object or the item corresponding to the location of the fingertip is selected after the second input device receives predetermined user input from the second input device.

20 Claims, 7 Drawing Sheets

(51) Int. Cl.
*G06F 3/0487* (2013.01)
*G06F 3/0346* (2013.01)

(56) References Cited

U.S. PATENT DOCUMENTS

| | | | | |
|---|---|---|---|---|
| 7,961,173 | B2* | 6/2011 | Boillot | G06F 3/017 345/158 |
| 8,203,502 | B1 | 6/2012 | Chi et al. | |
| 8,351,646 | B2 | 1/2013 | Fujimura et al. | |
| 8,836,768 | B1* | 9/2014 | Rafii | G06F 3/017 345/420 |
| 8,854,433 | B1* | 10/2014 | Rafii | G06F 3/017 348/42 |
| 8,861,797 | B2* | 10/2014 | Zavesky | G06F 3/005 382/115 |
| 2006/0103590 | A1 | 5/2006 | Divon | |
| 2008/0088528 | A1 | 4/2008 | Shindo et al. | |
| 2008/0276167 | A1* | 11/2008 | Michael | G06F 17/212 715/273 |
| 2011/0041100 | A1* | 2/2011 | Boillot | G06F 3/011 715/863 |
| 2012/0120121 | A1* | 5/2012 | Yoshida | G02B 27/2214 345/690 |
| 2012/0140021 | A1* | 6/2012 | Tanaka | H04N 7/142 348/14.07 |
| 2012/0169572 | A1* | 7/2012 | Seder | B60R 1/00 345/7 |
| 2012/0169861 | A1* | 7/2012 | Szczerba | G02B 27/01 348/78 |
| 2012/0173067 | A1* | 7/2012 | Szczerba | G02B 27/01 701/23 |
| 2012/0173069 | A1* | 7/2012 | Tsimhoni | G01C 21/365 701/25 |
| 2012/0174004 | A1* | 7/2012 | Seder | G02B 27/01 715/764 |
| 2012/0249422 | A1* | 10/2012 | Tse | G06F 3/0304 345/158 |
| 2012/0268364 | A1 | 10/2012 | Minnen | |
| 2013/0030811 | A1* | 1/2013 | Olleon | G06F 3/011 704/267 |
| 2013/0076615 | A1* | 3/2013 | Iao | G06F 3/017 345/156 |
| 2013/0219340 | A1* | 8/2013 | Linge | G06F 3/04883 715/834 |
| 2013/0241819 | A1* | 9/2013 | Yamashita | G06F 3/017 345/156 |
| 2014/0232631 | A1* | 8/2014 | Fleischmann | G06F 3/017 345/156 |
| 2014/0258942 | A1* | 9/2014 | Kutliroff | G06F 3/0488 715/863 |
| 2014/0331185 | A1* | 11/2014 | Carls | B60K 37/06 715/835 |

OTHER PUBLICATIONS

Cambridge (panoramic image projections, online publication from http://www.cambridgeincolour.com/tutorials/image-projections.htm, retrieved archive version of Jun. 29, 2006 from wayback machine (http://archieve.org/web/web.php)).*
Alon, J. et al., "A Unified Framework for Gesture Recognition and Spatiotemporal Gesture Segmentation," IEEE Trans. on Pattern Anal. Mach. Intel., 2009, pp. 1685-1699, vol. 31, No. 9.
Bimber, O., "What's Real About Augmented Reality," IEEE Computer, Jul. 2012, 2 pages.
Bretzner, L. et al., "Hand Gesture Recognition Using Multi-Scale Colour Features, Hierarchical Models and Particle Filtering," Proc. of the 5th Intl. Conf. on Automatic Face and Gesture Recognition, Washington D.C., May 2002, pp. 423-428.
Buehler, P. et al., "Learning Sign Language by Watching TV," IEEE Computer Vision and Pattern Recognition, 2009, pp. 2961-2968.
Cairnie, N. et al., "A Prototype Finger-Pointing Interface for Safer Operation of Secondary Motor Vehicle Controls," 12 pages, May be Retrieved at<URL:http://www.computing.dundee.ac.uk/projects/active/.../ActivePaper.doc>.
Franz, B. et al., "pieDrive—a New Driver-Vehicle Interaction Concept for Maneuver-Based Driving" Proceedings of the 2012 IEEE Intelligent Vehicles Symposium Workshops, 2012, pp. 1-6, May be Retrieved at<URL:http://www.dcc.fc.up.pt/HFIV12/203.pdf>.
Jojic, N. et al., "Detection and Estimation of Pointing Gestures in Dense Disparity Maps," Proc. of the 4th Intl. Conf. on Automatic Face and Gesture Recognition, 2000, Grenoble, France, 8 pages.
Liu, X. et al., "Hand Gesture Recognition Using Depth Data," Proc. of the 6th Intl. Conf. on Automatic Face and Gesture Recognition, May 2004, Seoul, Korea, 6 pages.
Pavlovic, V. et al., "Visual Interpretation of Hand Gestures for Human-Computer Interaction: A Review," IEEE Trans. on Pattern Anal. Mach. Intel., 1997, pp. 677-695, vol. 19, No. 7.
Riener, A., "Gestural Interaction in Vehicular Applications," IEEE Computer, Apr. 2012, pp. 42-47.
"Virtual Cable," Making Virtual Solid—California, LLC, 2011, 4 pages, [Online], [Retrieved on Dec. 22, 2014] Retrieved from the Internet<URL:http://www.mvs.net/.

* cited by examiner

INFORMATION QUERY BY POINTING

CROSS-REFERENCE TO RELATED APPLICATION

This disclosure claims priority under 35 U.S.C. §119(e) to U.S. Provisional Patent Application No. 61/780,023, filed on Mar. 13, 2013, which is incorporated by reference herein in its entirety.

FIELD OF DISCLOSURE

The present disclosure is related to the query of information in a vehicle by tracking the fingertip movements of a user.

BACKGROUND OF DISCLOSURE

A driver of a vehicle typically operates devices in the vehicle using switches, screens, keypads or other input mechanism that typically involve fingers or hands. Such input mechanisms may be used to operate, for example, a navigation system, an entertainment system, a climate system, and a phone system. Head-up displays (HUDs) are also being used to present information associated with such systems on the windshield of a vehicle. The HUDs can present various types of useful information to the driver without having the user to change the point of gaze from a road to the dashboard or console of the vehicle.

Sometimes, a complicated series of operations must be performed on the input mechanism to issue a desired command to the devices in a vehicle. Such operations may cause the driver to operate a steering wheel of the vehicle by one hand while operating the input mechanism using the other hand. However, it is preferable for the driver to keep both hands on the steering wheel and operate these input devices by a hand intermittently for only a brief period of time. Depending on the complexity of the operations, it may take multiple attempts to operate the input devices before the driver can perform operations as desired.

Further, the speed of the vehicle sometimes demands quick input from the driver. For example, if a driver is looking for a nearby restaurant on a highway, he may have a limited time to query the navigation system before passing an exit of the highway. If the query and the response are not made before passing the exit, the driver may have to take another query for the restaurants near the next exit. Such query operations are often made while the user is actively engaged in the operation of the vehicle, exacerbating the likelihood of inaccurate input due to decreased attention span and mobility of hands.

Due to limited attention span and mobility of hands, the driver may end up providing inaccurate user input. Such user input result in unintended operations and waste of time spent on subsequent remedial actions.

SUMMARY OF THE DISCLOSURE

Embodiments relate to processing a depth image covering a hand of a user to determine a fingertip location of a pointing finger and receiving a selection signal by an input device to perform an operation associated with an object or item shown at a location or region of a display device corresponding to the location of the fingertip. A depth camera placed in a vehicle captures the hand of the user and generates the depth image. The location of the fingertip of the pointing finger is determined by processing the captured depth image. A selection signal is received from the input device to indicate selection of the item or the object at a location or a region of the display device corresponding to the location of the fingertip. The operation associated with the item or the object is performed after receiving the selection signal.

In one embodiment, the location of the fingertip is determined by generating a skeleton structure of the hand. The skeleton structure includes a plurality of line segments, each representing different parts of the hand.

In one embodiment, the input device includes a microphone for receiving a verbal command from the user. The selection signal is generated by performing speech recognition on the verbal command.

In one embodiment, the input device includes a button or switch, and the selection signal indicates that the input device was operated.

In one embodiment, the result of the operation is displayed on the display device.

In one embodiment, the display device is divided into a plurality of regions with the horizontal width of the regions differing based on the horizontal locations of the regions.

In one embodiment, the display device is a volumetric head-up display (HUD) device projecting artificial graphical elements onto a windshield of the vehicle.

In one embodiment, the location or the region of the display device corresponding to the location of the fingertip is determined by identifying one of a plurality of virtual areas mapped to the fingertip by a first mapping.

In one embodiment, the location or the region of the display device corresponding to the location of the fingertip is further determined by identifying the location or the region of the display device corresponding to the identified virtual area by a second mapping.

In one embodiment, each of the plurality of virtual areas is segmented along a projection of an equiangular section of a semicircle onto a plane.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the subject matter.

BRIEF DESCRIPTION OF THE DRAWINGS

The teachings of the present disclosure can be readily understood by considering the following detailed description in conjunction with the accompanying drawings.

DETAILED DESCRIPTION OF THE DISCLOSURE

Figure 1A:
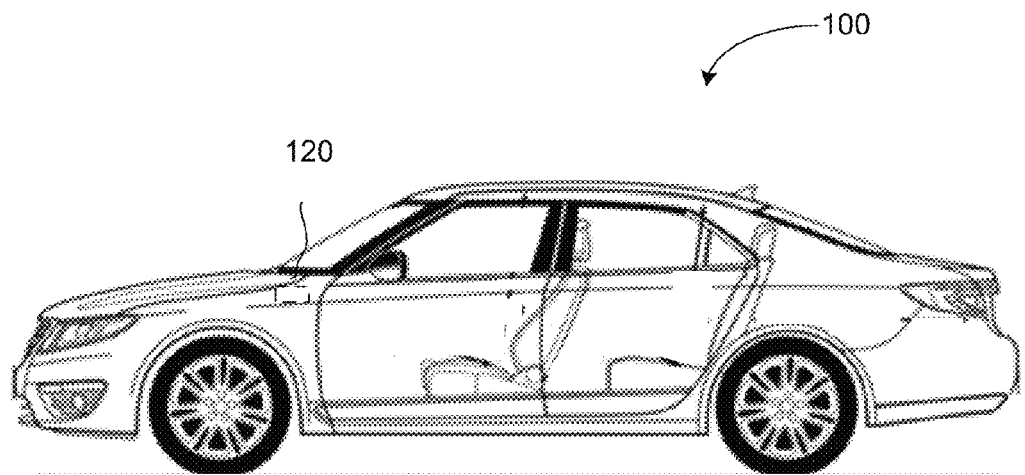
FIG. 1A is a side view of an exemplary vehicle equipped with an image capturing device and a head-up display unit, according to one embodiment.

A preferred embodiment is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions could be embodied in software, firmware or hardware, and when embodied in software, could be downloaded to reside on and be operated from different platforms used by a variety of operating systems.

Embodiments also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings as described herein, and any references below to specific languages are provided for disclosure of enablement and best mode.

In addition, the language used in the specification has been principally selected for readability and instructional purposes, and may not have been selected to delineate or circumscribe the subject matter. Accordingly, the disclosure is intended to be illustrative, but not limiting, of the scope, which is set forth in the following claims.

Embodiments relate to navigating through objects or items in a display device (e.g., head-up display device) using a first input device (e.g., a camera) to detect pointing of a user's finger (e.g., index finger) to an object or item and using a second input device (e.g., a microphone) to receive the user's indication on the selection of the object or the item. An image of the hand is captured by the first input device and is processed to determine a location on the display device corresponding to the location of the fingertip of the pointing finger. The object or the item corresponding to the location of the fingertip is selected after the second input device receives predetermined user input from the second input device.

As used herein, the term "user" includes a driver of a vehicle as well as a passenger of the vehicle. The user may be anyone attempting to control one or more devices in the vehicle.

As used herein, a "pointing finger" refers to a user's finger being used to indicate a location on the display device by pointing. The pointing finger is stretched whereas other fingers are folded or grabs an object (e.g., a steering wheel). The pointing finger is mostly the index finger, but other fingers may also be used as the pointing finger.

Overview of Vehicle Equipped with Fingertip Detection Mechanism

Figure 1B:
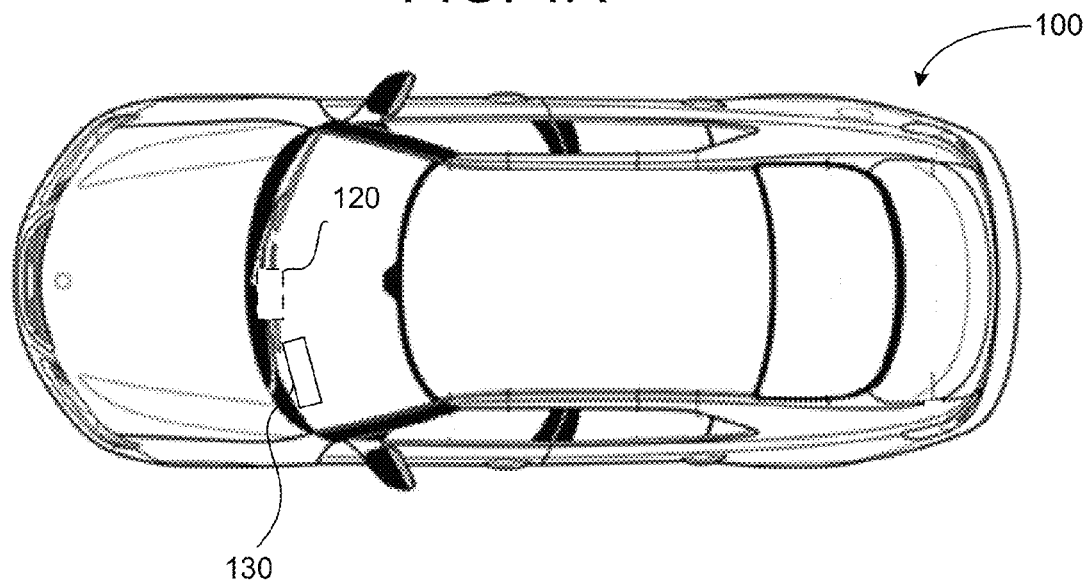
FIG. 1B is a top view of the exemplary vehicle of FIG. 1A, according to one embodiment.

FIGS. 1A and 1B illustrate a vehicle 100 equipped with a command processing system, according to one embodiment. The command processing system may include, among other components, an image capturing device 120 and a head-up display (HUD) system 130. The command processing system may be connected to other components (e.g., wireless communication system) of the vehicle 100 to perform various operations. The command processing system detects a location or a region on a display device that is pointed by a user's finger.

The image capturing device 120 captures images of a user (either a driver or a passenger), and sends the images to an image processing module 214 for further processing. The image capturing device 120 is placed to face the user and generate a user's frontal image including at least the user's right or left hand. In one embodiment, the image capturing device 120 is a depth camera that detects the distance from the depth camera to different portions of the user's body. The captured images may be a grayscale image where a brighter pixel indicates a portion of the user's body closer to the image capturing device 120 and a darker pixel indicates a portion of the user's body or background material further away from the image capturing device 120.

The HUD system 130 projects graphical elements on the windshield of the vehicle 100 so that the user may view the projected images overlaid over real objects outside the vehicle. The graphical elements may include, for example, icons, text boxes, advertisements, arrows, and line elements. Some or all of such graphical elements may be selected by the user for certain operations.

In one or more embodiments, the HUD system 130 embodies an augmented reality (AR) by projecting graphical elements onto actual objects that the user perceives as being present at the opposite side of the windshield, outside of the vehicle. The graphical elements may be placed on or blended with the actual objects so that the user perceives the graphical elements as being part of the real object. 3D Volumetric HUD may be used to give more realistic blending of graphical elements and real-world actual objects by matching the focal points of the graphical elements with the real-world actual objects. An example of an image shown on the windshield using AR is described below in detail with reference to FIG. 5.

The command processing system may include other components not illustrated in FIGS. 1A and 1B. For example, the command processing system may include a computing device installed within a dashboard or other areas of the vehicle 100 to perform further processing of the images captured by the image capturing device 120.

Although embodiments are described primarily with reference to using HUD as the display device, other embodiments may use liquid crystal display (LCD) or other display devices. In such embodiments, the command processing system may be used to select display items displayed in such display device.

Example Command Processing System

Figure 2:
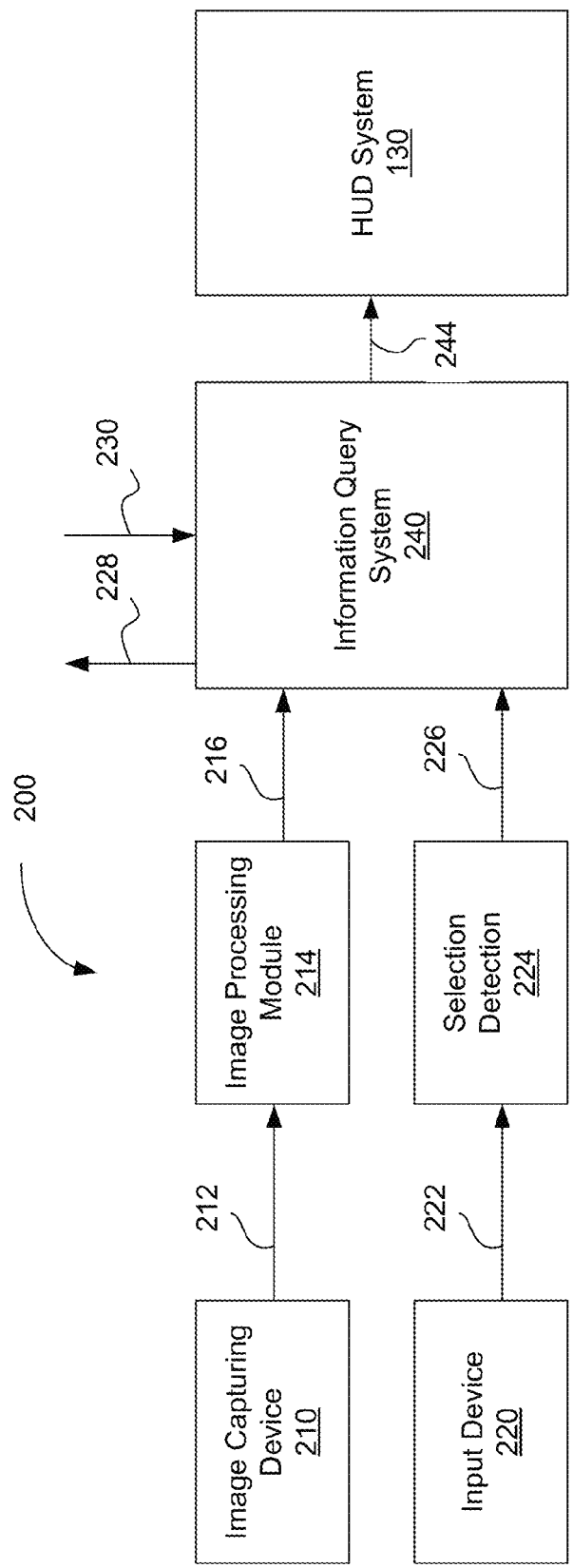
FIG. 2 is a block diagram of an exemplary command processing system, according to one embodiment.

FIG. 2 is a block diagram illustrating the command processing system 200, according to one embodiment. The command processing system 200 enables the user to manipulate and select information query operations to be performed by the vehicle. The command processing system 200 may include, among other components, an image capturing device 210, an image processing module 214, an input device 220, a selection detection module 224, an information query system 240 and the HUD system 130. Although not illustrated in FIG. 2, the command processing system 200 may also include other components such as additional input devices and speakers to generate synthesized voice.

The image processing module 214 is hardware, firmware, software or a combination thereof for processing images 212 to detect the location 216 of the user's fingertip. The images 212 may be a depth image. The image processing module 214 extracts the regions of the image 212 around the user's hand by cropping the image 212, and generates a skeleton structure of the hand from the image 212.

The input device 220 is hardware, firmware, software or a combination thereof for receiving input from the user using mechanism other than image capturing. The input device 220 may be a microphone for detecting verbal commands. Alternatively, the input device 220 may be a button or a switch provided on the steering wheel of the vehicle or other easily accessible areas of the vehicle such as dashboard. The input device 220 receives user input indicating selection of operations after the user determines that the location or region of the display device indicated by the fingertip movement is one which the user intends to perform an operation upon. As a result of providing the user input, a sensor signal 222 is generated by the input device 220.

The selection detection module 224 is an interface device that receives the sensor signal 222 and generates a selection signal 226 indicating that the location or region of the display device indicated by the fingertip movement is one which the user intends to perform an operation upon. When the microphone is used as the input device 220 to detect verbal commands, the selection detection module 224 may be part of a speed recognition system.

The information query system 240 is hardware, software, firmware or a combination thereof for performing various information query operations based on user input. Example information query system 240 includes, among other systems, on-board navigation systems, entertainment systems, phone operating systems and vehicle climate control systems. The information query system 240 may be a combined system to perform all or a subset of such functions. The information query system 240 may also send query information 228 to an external system and receive reply information 230 from the external system.

The information query system 240 receives the location 216 of the user's fingertip and the selection signal 226 to perform operations as desired by the user. After performing the operation as indicated by the location 216 of the user's fingertip and the selection signal 226, the information query system 240 sends display information 244 to the HUD system 130 or other display devices to present relevant information to the user.

In one or more embodiments, the input device 220 and the selection detection module 224 may be obviated. Instead, predetermined actions on the finger (e.g., fast double twitching action) may be used and detected to indicate selection of an object or item shown on the HUD system 130.

Example Architecture of Image Processing Module

Figure 3:
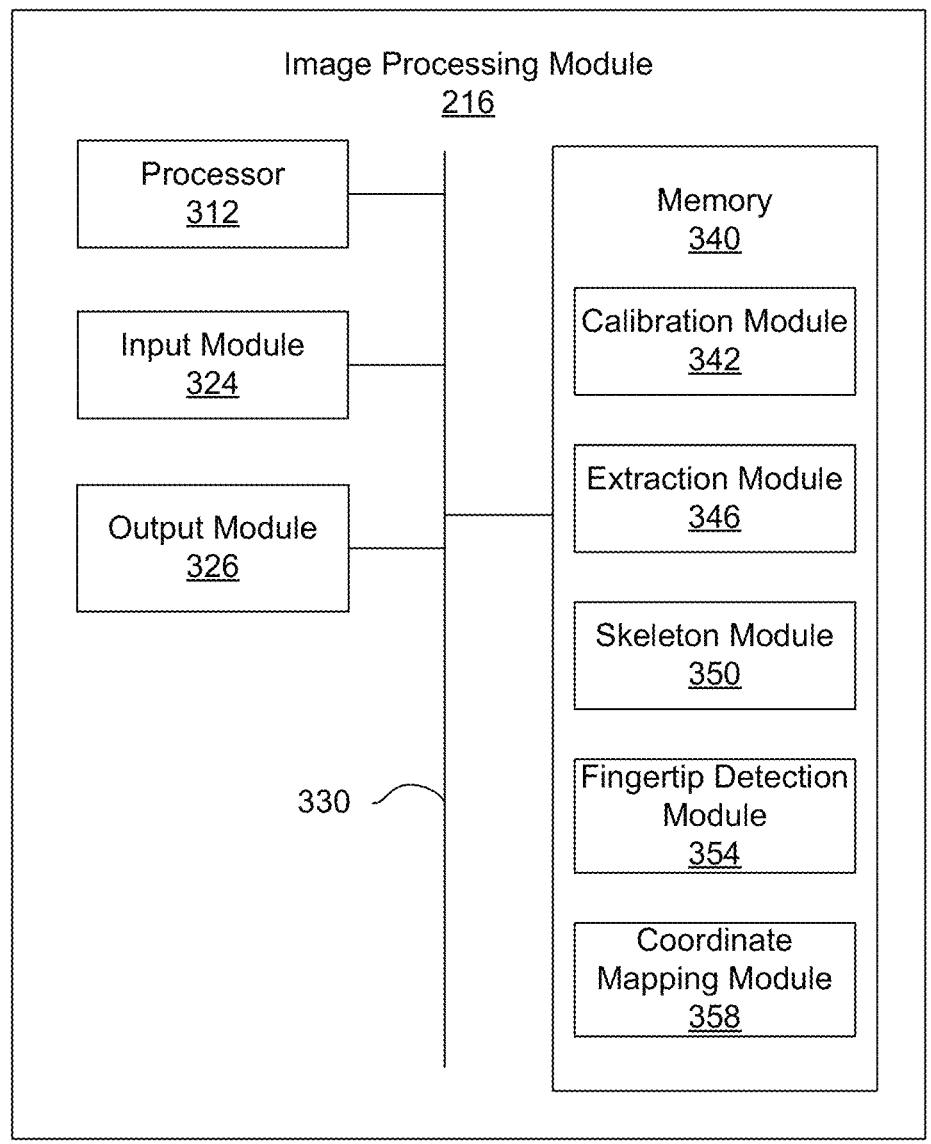
FIG. 3 is a block diagram of an exemplary image processing module in the command processing system, according to one embodiment.

FIG. 3 is a block diagram illustrating components of the image processing module 214, according to one embodiment. The image processing module 216 may include, among other components, a processor 312, an input module 324, an output module 326, memory 340 and a bus 330 connecting these components. The image processing module 216 may be a separate stand-alone device or part of a larger system that also performs operations other than the image processing.

The processor 312 is a hardware component that executes instructions stored in memory 340. The input module 324 is a hardware component for receiving the image 212 from the image capturing device 210. The input module 324 may include a buffer for temporarily storing one or more images 212. The output module 326 is a component for sending the location 216 of the fingertip to the information query system. These components may be embodied in a single integrated circuit (IC) chip or multiple IC chips.

The memory 340 is a non-transitory computer-readable storage medium that stores software components. The software components stored in the memory 340 may include, among other components, a calibration module 342, an extraction module 346, a skeleton module 350, a fingertip detection module 354 and a coordinate mapping module 358. The memory 340 may also store other modules such as tracking module for tracking and storing the trajectory of the user's hand or fingertip and a filtering module for filtering out noise in the image 212.

The calibration module 342 stores instructions for receiving and storing user input for calibrating the image processing module 216. In one or more embodiments, the calibration is performed by instructing the user to (i) place his or hand on the steering wheel in a comfortable pose, and (ii) move a pointing finger (e.g., index finger) to the rightmost, leftmost, bottom and top positions while the palm of the hand is placed on the steering wheel. The locations of the fingertip corresponding to the four points are then mapped to locations or regions (i.e., cells) of the display device (e.g., HUD windshield). Intermediate locations of the fingertip and other locations or regions in the display device are mapped by interpolation.

The extraction module 346 stores instructions for cropping the image 212 to extract a region of the image 212 showing the user's hand. The user's hands tend to be closest to the camera, and hence, the region of the image 212 showing the hand can be extracted by using the depth information of the image. For increased accuracy of the extraction, the movements of pixel clusters may be tracked over time, for example, using techniques as described in U.S. Pat. No. 7,308,112 (issued on Dec. 11, 2007, hereinafter referred to as "the '112 patent") and U.S. Pat. No. 8,351,646 (issued on Jan. 8, 2013, hereinafter referred to as "the '646 patent"), which are incorporated by reference herein in their entirety.

The skeleton module 350 generates a skeleton structure of the hand in the extracted image. One of many techniques that can be used for generating the skeleton structure is described in a section entitled "Skeleton Generation" in the '112 patent. The skeleton structure includes a line segment for at least the pointing finger and may also include other line segments for other fingers of the user.

The fingertip detection module 354 determines the location of the fingertip based on the skeleton structure of the hand. One way of determining the location of the fingertip is to use a circle moving along a line segment representing the pointing finger to determine the location of the fingertip. Another way of using the location of one or more pixels of the hand closest to the camera as the location of the fingertip. When the pointing finger is pointing at the camera, the skeleton module 350 may not generate a line segment that accurately represents the pointing finger, and hence, the pixel points of the hand closest to the camera are selected as corresponding to the fingertip without using the skeleton structure. The location of the fingertip determined by the fingertip detection module 354 is sent to the coordinate mapping module 358.

The coordinate mapping module 358 processes the mapping information generated in the calibration module 342 and the location of the fingertip detected by the fingertip detection module 354 to determine a coordinate in the display device corresponding to the location of the fingertip. In one embodiment, the coordinate is converted into a coordinate of point or region in the display device, as described below in detail with reference to FIG. 5.

Example Method of Querying Information Using Fingertip Location

Figure 4:
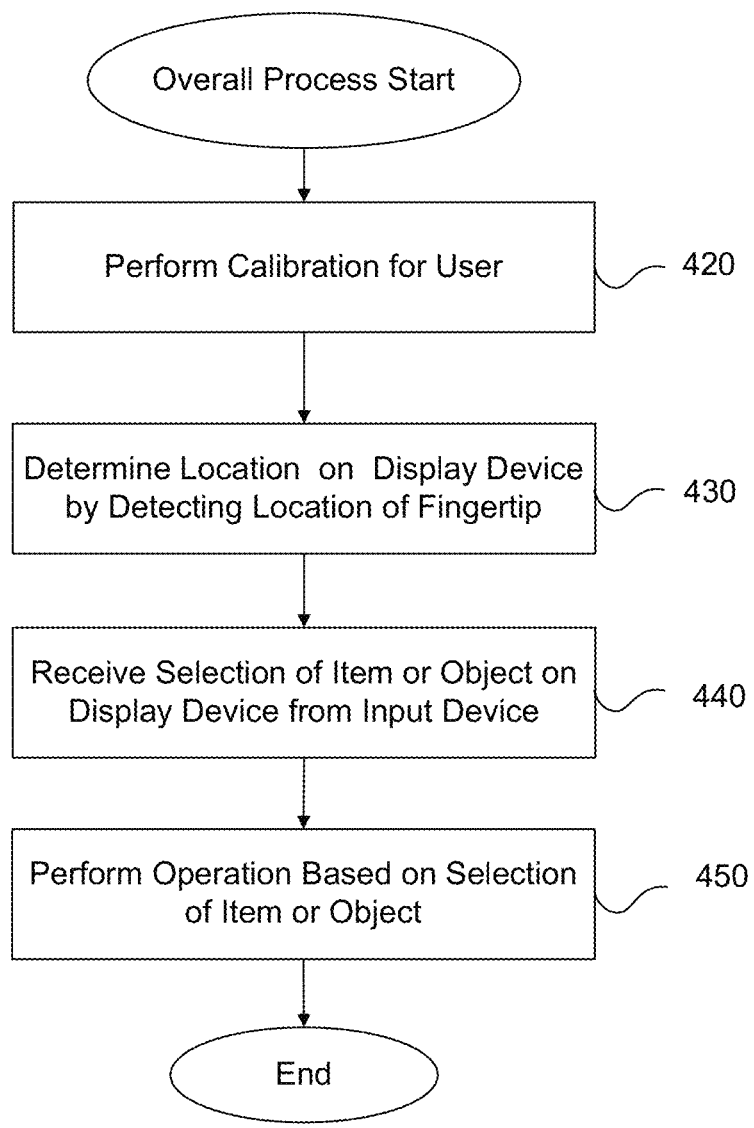
FIG. 4 is a flowchart of an exemplary method for processing user commands, according to one embodiment.

FIG. 4 is a flowchart of a method for processing user commands, according to one embodiment. First, calibration is performed 420 for a user in a vehicle. The calibration may include having the user place hands on the steering wheel and having the user point a finger in certain directions. As a result of the calibration, mapping between the user's fingertip locations and points or regions on a display device can be established.

A location on the display device is determined 430 by detecting the location of a tip of a user's pointing finger. The location of the user's fingertip may be detected by processing a depth image.

The selection of an item or an object at the location or region corresponding to the location of the user's fingertip is received 440 from the input device 220. The selection of the item or object can be compared to operation in a desktop or laptop computer where a button on a mouse is clicked or double-clicked after a pointer is placed on the item or object.

Based on the selection of the item or object, an operation is performed 450 by the information query system 240. The operation may include, for example, retrieving information of a target item or object from the on-board navigation system or the entertainment system, collecting telemetric data from an external source, launching application for execution, placing or receiving a phone call, and retrieving statistics (e.g., driving distance and speed) on a current driving session. The result of the operation may be displayed on the display device.

Although above embodiments were described using a skeleton generated from captured images to detect the pointing direction of a finger, various other schemes may be used to detect the pointing direction without using a skeleton.

Example Cell Division in Display Device

Figure 5:
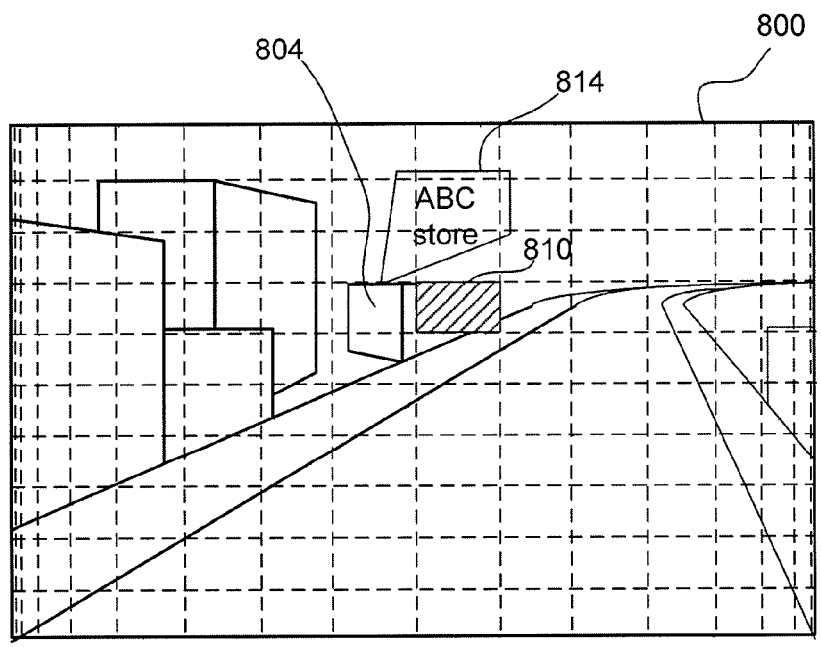
FIG. 5 a diagram illustrating a view on an exemplary windshield seen by a user projected with a head-up display (HUD) image, according to one embodiment.

FIG. 5 is a diagram illustrating a view 800 seen by a user on a windshield projected with a HUD image, according to one embodiment. The view 800 includes actual objects outside the windshield as well as artificial graphical elements projected onto the windshield by the HUD system 130. In one embodiment, augmented reality (AR) is implemented by blending the actual images with the artificial graphical elements. The user may use a pointing finger (e.g., an index finger) to navigate through and select an object or item shown in the windshield.

Since the range of vertical movement of the finger is more restricted compared to the horizontal movement, the HUD image 800 may have lower vertical resolution compared to the horizontal resolution. In the example of FIG. 5, the vertical resolution is 10 regions (i.e., cells) while the horizontal resolution is 17 cells. The user may move the pointing finger to select one of these cells (e.g., cell 810) to perform certain operation. In the example of FIG. 5, cell 810 is selected. As a result, information 814 of the building 804 having a portion of image shown in cell 810 is displayed on the HUD windshield.

Further, the cells have a large size at the center locations compared to the right or left end locations. The right or left extreme ends are more difficult to reach due to the limited movement of the finger at both ends, as described below in detail with reference to FIG. 6. Therefore, by having the cells in the center of the HUD windshield cover a larger area, the user can more intuitively control the selection of the cells by moving the fingers. Although the vertical height of each cell is the same in FIG. 8, the height of each cell may be varied to account for the difficulty in reaching the top and bottom ends of the finger movements.

In one or more embodiments, the cells are mapped to the fingertip locations. In these embodiments, the image processing module 214 produces the identity of the cell corresponding to the current location of the fingertip. In other modes of operation, the image processing module 214 may generate coordinates of the center of the fingertip location.

In one embodiment, a location on the HUD image 800 corresponding to the fingertip location is illuminated to facilitate the user to correctly point to an object or item of interest.

Figure 6:
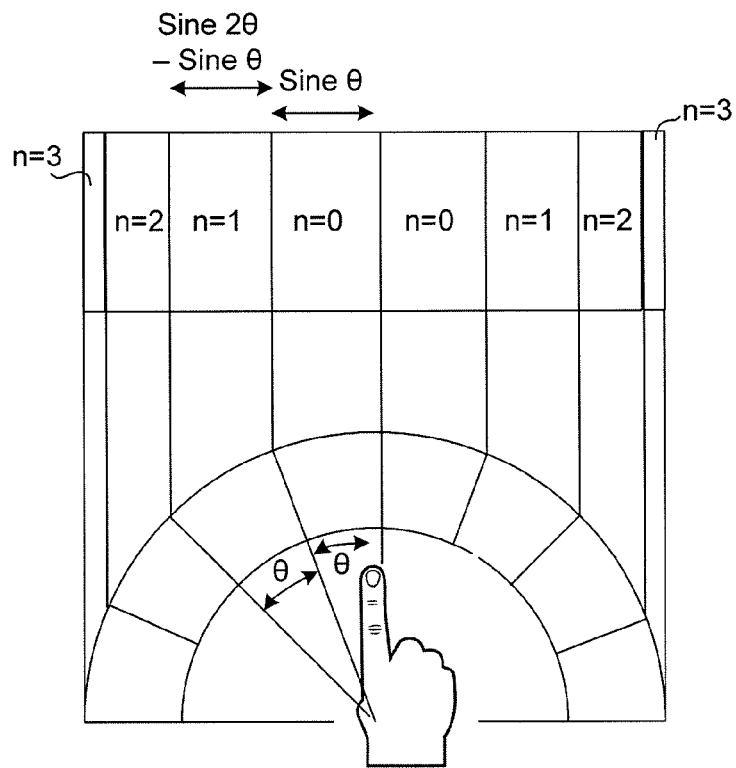
FIG. 6 is a diagram illustrating exemplary horizontal division of cells based on the rotation angle of finger, according to one embodiment.

FIG. 6 is a diagram illustrating horizontal division of cells based on rotation angle of finger, according to one embodiment. A pointing finger has limited range of mobility, especially when other fingers are gripping a steering wheel. In the embodiment of FIG. 6, only 8 cells are illustrated for the sake of explanation, but in practice, the region of the display device is segmented with a higher resolution (e.g., horizontal division into 30 cells).

The cells of the HUD image in FIG. 6 horizontally divide the horizontal dimension of the display device so that each cell has a width corresponding to (sine $n \times \theta$ – sine $(n-1)\theta$) where n is the sequence of cells starting from the center cell (n of the center cell is 0) and increasing towards the left or right ends. That is, the cells are divided at locations corresponding to the projection of equiangular sections of a semicircle cut along the center. The division of cells in the manner of FIG. 6 results in a more intuitive control of selection operation when the pointing finger is moved horizontally.

The horizontal division of the regions of the display device as shown in FIGS. 5 and 6 is merely illustrative. Various other ways may be used to horizontally segment the regions of the display device. For example, the regions of the display device may be divided so that each cell has the same horizontal width.

Figure 7:
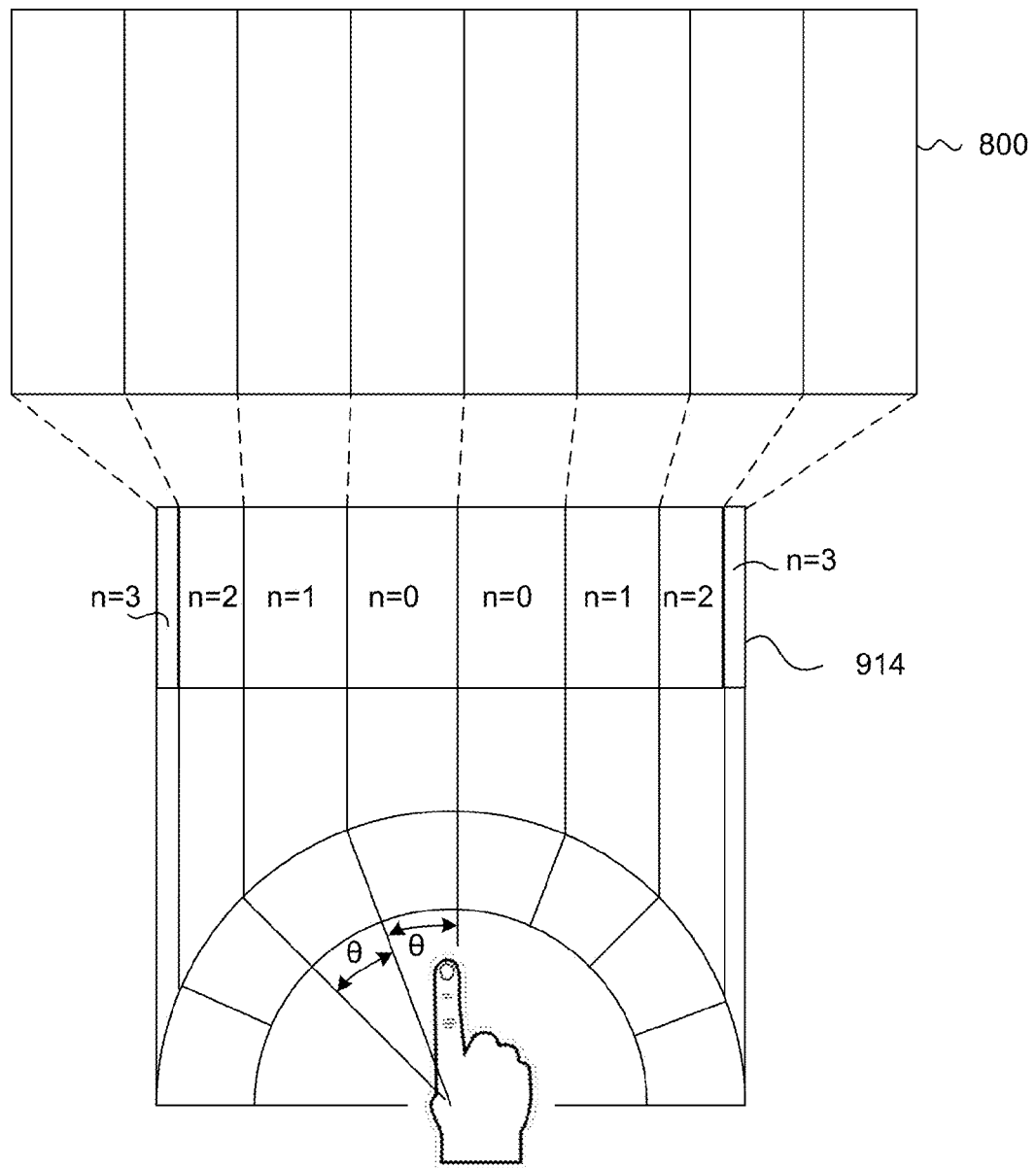
FIG. 7 is a diagram illustrating mapping of the rotating angle of a finger to horizontally divided cells, according to one embodiment.

FIG. 7 is a diagram illustrating mapping of the rotating angle of a finger to horizontally divided cells, according to one embodiment. In the embodiment of FIG. 7, the rotating angle of finger is mapped to one of virtual columns 914 having different widths in a similar way as described above with reference to FIG. 6. Specifically, the virtual columns are divided at locations corresponding to the projection of equiangular sections of a semicircle cut along the center.

However, the virtual columns 914 are again mapped to the view screen 800 having cells of equal horizontal spacing. That is, the rotation of the finger is mapped to cells by using double mapping, one from the finger to the virtual columns 914, and then from the virtual columns to cells of the view screen 800. In this way, the small rotation of finger near the right and left extremes causes a relatively large horizontal movement at the left end and right end of the view screen 800. By double mapping the rotation of the finger to the virtual columns and then mapping the virtual columns to the cells of the view screen 800, a user can more intuitively navigate and perform selection operation using the rotation of the finger.

In one or more embodiments, the command processing system 200 operates in a writing mode where the movement of the fingertip is tracked to enable the user to draw alphanumeric characters or symbols by moving the pointing finger. The writing mode is turned on by providing certain user input at the input device 220. The location of the fingertip is tracked as the fingertip is moved. The trajectory of the fingertip is obtained and compared with stored sets of patterns to determine a character or symbol corresponding to the fingertip trajectory. In order to remove noise and make the tracking of the finger more robust, a filter (e.g., Butterworth filter) may be used.

In one or more embodiments, the command processing system 200 is used in a transportation apparatus other than a vehicle. The command processing system 200 can be used, for example, in airplanes or motorcycles.

Figure 8:
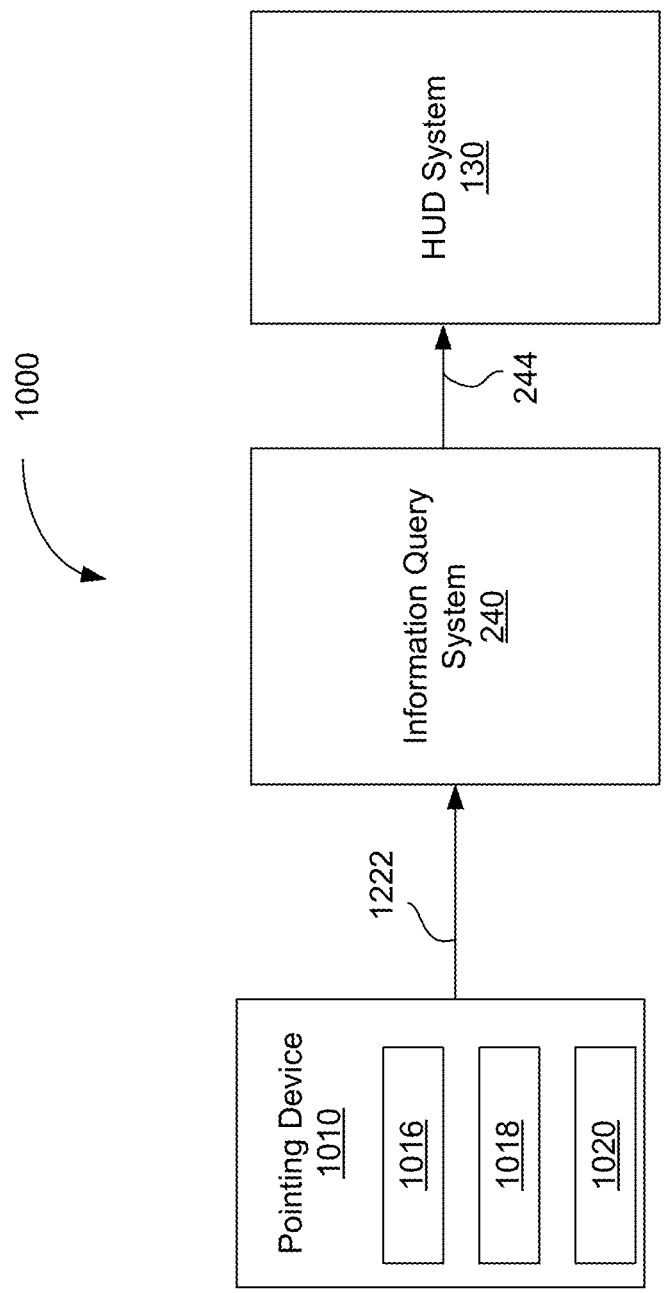
FIG. 8 is a diagram illustrating an exemplary command system using a pointing device to operate an information query system, according to one embodiment.

In some embodiments, a pointing device may be used instead of a finger to point to an item or object shown on the windshield of the vehicle 100. FIG. 8 is a diagram illustrating a command system 1000 using of a pointing device 1010 to operate information query system 240, according to one embodiment. The pointing device 1010 may be embodied as various portable devices including, but not limited to, a key fob, a cell phone, a remote controller and a pen. The pointing device is held by a user and pointed toward certain objects or items shown in the windshield. Certain actions (e.g., pressing of a button) may be taken on the pointing device or in other devices to select an object or item being pointed at by the pointing device 1010.

The portable device 1010 may include, among other components, a sensor 1016 to sense the pointing direction of the portable device and a communication module 1018 for sending signal 1222 over to the information query system 240 via wire or wireless communication. The sensor 1016 may be an inertial sensor including one or more of accelerometers, gyroscopes and magnetometers to detect the movement and orientation of the portable device 1010. The portable device 1010 may include a circuit 1020 for receiving sensor signals from the sensor 1016 and process the sensor signal to indicate a coordinate or a cell of the view window 800. Alternatively, sensor signals may be sent over to information query system 240 for processing and detecting of pointing orientation of the pointing device 1010. In one embodiment, the sensor and circuit may be integrated into a single unit. For example, 3DM orientation sensor available from LORD MICROSTAIN SENSING SYSTEMS of Williston, Vt. may be used as the single unit including the sensor and the circuit.

In one embodiment, the portable device 1010 further includes a light source for emitting light onto the windshield. When the light hits the windshield, a point of light may be visible on the windshield. The light shown on the windshield enables the user to confirm the location on the windshield where the pointing device 1010 is pointing at, and adjust the orientation of the pointing device 1010 accordingly to select an object or item display on the windshield.

Calibration may be performed to align the orientation of the pointing device 1010 with the locations on the windshield. Information from Global Positioning System (GPS) or magnetometers may be used to automatically calibrate the orientation of the pointing device 1010.

The architecture and functions of information query system 240 and HUD system 130 of system 1000 are substantially similar to or the same as those of command system 200 of FIG. 2, and therefore, detailed description thereof is omitted herein for the sake of clarify.

Although several embodiments are described above, various modifications can be made within the scope of the present disclosure.

The invention claimed is:
1. A method, comprising:
  capturing a depth image by a depth camera placed in a vehicle, the depth image covering a hand of a user and comprising pixels representing distances from the depth camera to parts of the user;

determining a location of a fingertip of a pointing finger of the hand by processing the captured depth image;

determining a location or region of a display device corresponding to the location of the fingertip, wherein the display device is divided into a plurality of equiangular sections of a semicircle along a center portion of the display device, each equiangular section having a width corresponding to (sine (n×θ)−sine (n−1)×θ) where n is the sequence of the plurality of equiangular sections starting from 0 of a center equiangular section and increasing towards left or right ends of the display device, and θ is a rotation angle of the fingertip of the pointing finger;

receiving a selection signal indicating selection of an item or an object at the determined location or the region of the display device based on a sensor signal received from an input device in the vehicle; and performing an operation associated with the selected item or object responsive to receiving the selection signal.

2. The method of claim 1, wherein determining the location of the fingertip comprises generating a skeleton structure of the hand including a plurality of line segments, each of the plurality of line segments representing different parts of the hand.

3. The method of claim 1, further comprising tracking the location of the fingertip to recognize a character or symbol drawn by the pointing finger.

4. The method of claim 1, wherein the input device comprises a microphone for receiving a verbal command from the user, and the selection signal is generated by performing speech recognition on the verbal command.

5. The method of claim 1, wherein the input device comprises a button or switch, and the selection signal indicates that the input device was operated.

6. The method of claim 1, further comprising displaying a result of the operation on the display device.

7. The method of claim 1, wherein the plurality of equiangular sections have horizontal widths that are determined based on horizontal locations of the plurality of equiangular sections, each of a plurality of locations of the fingertip mapped to one of the plurality of the equiangular sections.

8. The method of claim 1, wherein the display device comprises a volumetric head-up display (HUD) device projecting artificial graphical elements corresponding to items or objects onto a windshield of the vehicle.

9. The method of claim 1, wherein the location or the region of the display device corresponding to the location of the fingertip is determined by identifying one of a plurality of virtual areas mapped to the fingertip by a first mapping.

10. The method of claim 9, wherein the location or the region of the display device corresponding to the location of the fingertip is further determined by:

identifying the location or the region of the display device corresponding to the identified virtual area by a second mapping.

11. The method of claim 9, wherein each of the plurality of virtual areas is a projection of one of the equiangular sections of the semicircle onto a plane.

12. A command processing system, comprising:

a depth camera placed in a vehicle and configured to capture a depth image covering a hand of a user and comprising pixels representing distances from the depth camera to parts of the user;

an image processing module configured to:
  determine a location of a fingertip of a pointing finger of the hand by processing the captured depth image, and
  determine a location or region of a display device corresponding to the location of the fingertip, wherein the display device is divided into a plurality of equiangular sections of a semicircle along a center portion of the display device, each equiangular section having a width corresponding to (sine (n×θ)−sine (n−1)×θ) where n is the sequence of the plurality of equiangular sections starting from 0 of a center equiangular section and increasing towards left or right ends of the display device, and A is a rotation angle of the fingertip of the pointing finger; and an information query system configured to:
  receive a selection signal indicating selection of an item or an object at the determined location or the region of the display device based on a sensor signal received from an input device in the vehicle; and
  perform an operation associated with the selected item or object responsive to receiving the selection signal.

13. The system of claim 12, wherein the image processing module is configured to:

generate a skeleton structure of the hand including a plurality of line segments, each of the plurality of line segments representing different parts of the hand.

14. The system of claim 12, further comprising tracking the location of the fingertip to recognize a character or symbol drawn by the pointing finger.

15. The system of claim 12, further comprising a selection detection module configured to perform speech recognition on a verbal command received by the input device.

16. The system of claim 12, further comprising the display device configured to display a result of the operation.

17. The system of claim 12, wherein the display plurality of equiangular sections have horizontal widths that are determined based on the horizontal locations of the plurality of equiangular sections, each of a plurality of locations of the fingertip mapped to one of the plurality of the equiangular sections.

18. The system of claim 12, wherein the display device comprises a volumetric head-up display (HUD) device projecting artificial graphical elements corresponding to items or objects onto a windshield of the vehicle.

19. The system of claim 12, wherein the image processing module is configured to determine the location or the region of the display device corresponding to the location of the fingertip by identifying one of a plurality of virtual areas mapped to the fingertip by a first mapping.

20. The system of claim 19, wherein the image processing module is further configured to determine the location or the region of the display device corresponding to the location of the fingertip is further determined by:

identifying the location or the region of the display device corresponding to the identified virtual area by a second mapping.

* * * * *